United States Patent [19]

Cole

[11] Patent Number: 4,600,617

[45] Date of Patent: Jul. 15, 1986

[54] CONTINUOUS FIBER INSERTS FOR INJECTION MOLDED PARTS

[75] Inventor: Bill W. Cole, Naperville, Ill.

[73] Assignee: Standard Oil Company (Indiana), Chicago, Ill.

[21] Appl. No.: 604,986

[22] Filed: Apr. 27, 1984

[51] Int. Cl.⁴ .................. B29F 1/00; B32B 17/10; B32B 27/12

[52] U.S. Cl. .................. 428/64; 264/257; 264/320; 264/324; 264/331.12; 428/225; 428/251; 428/252; 428/272; 428/273; 428/288; 428/292; 428/367; 428/408; 428/435; 428/473.5; 528/188

[58] Field of Search .......... 264/257, 320, 324, 331.12; 528/188; 428/64, 251, 252, 272, 273, 288, 292, 435, 367, 408, 473.5, 225

[56] References Cited

U.S. PATENT DOCUMENTS

| | | |
|---|---|---|
| 3,347,828 | 10/1967 | Stephens et al. .................. 528/351 |
| 3,494,890 | 2/1970 | Morello .................. 528/188 |
| 3,573,260 | 3/1971 | Morello .................. 528/188 |
| 3,661,832 | 5/1972 | Stephens .................. 528/351 |
| 4,016,140 | 4/1977 | Morello .................. 528/188 |
| 4,283,361 | 8/1981 | Longworth .................. 264/126 |
| 4,309,528 | 1/1982 | Keske et al. .................. 264/331.12 |
| 4,313,868 | 2/1982 | Hanson .................. 528/188 |
| 4,358,561 | 11/1982 | Keske et al. .................. 264/331.12 |
| 4,431,600 | 2/1984 | Sakamoto .................. 528/188 |
| 4,448,925 | 5/1984 | Hanson .................. 528/188 |

*Primary Examiner*—James C. Cannon
*Attorney, Agent, or Firm*—Gunar J. Blumberg; William T. McClain; William H. Magidson

[57] ABSTRACT

A process for incorporating continuous graphite fiber reinforcement impregnated with polyamide-imide polymer onto injection molded polyamide-imide parts. These impregnated parts are useful as automotive parts such as push rods or rocker arms, and for aircraft parts such as fittings and secondary structural parts.

9 Claims, No Drawings

CONTINUOUS FIBER INSERTS FOR INJECTION MOLDED PARTS

BACKGROUND OF THE INVENTION

1. Field of the Invention

The field of this invention relates to the incorporation of continuous graphite fiber reinforcement impregnated with polyamide-imide into injection molded amide-imide parts.

2. Background

Amide-imide polymers and copolymers are a relatively new class of organic compounds known for their solubility in nitrogen-containing organic solvents when in the largely polyamide form. In the past, the major application of these amide-imide polymers has been as wire enamels. This is illustrated in U.S. Pat. Nos. 3,661,832 (1972), 3,494,890 (1970) and 3,347,828 (1967). Amide-imide polymers and copolymers have also been found useful for molding applications as shown in U.S. Pat. Nos. 4,016,140 (1977) and 3,573,260 (1971). U.S. Pat. Nos. 4,136,085 (1979), 4,313,868 (1982), and 4,309,528 (1982) are incorporated herein by reference. These polyamides-imides are known for their outstanding mechanical properties, but they are also difficult to process, as it is particularly difficult to incorporate continuous fiber reinforcement impregnated with the polyamide-imides into injected molded parts made from the polyamide-imides. This difficulty is a consequence of insufficient flow of the polymer. The art has been looking for improvements in the flow and reduction in melt reactivity during fabrication of the polymers, but it is essential that an additive not impair the excellent mechanical properties of the polyamide-imide polymers and copolymers, when forming the continuous fiber inserts for amide-imide molded parts. The ideal flow improving agent for these polymers would be one which plasticizes the polymers during injection molding and crosslinks the polymers and copolymers during the curing or annealing step so that the plasticizing effect would be neutralized by cross-linking.

The general object of this invention is to provide polyamide-imide molded objects reinforced with continuous graphite fiber skins or inserts impregnated with polyamide-imide polymer. A more specific object of this invention is to provide a process for incorporating continuous graphite fiber reinforcement impregnated with polyamide-imide polymer into injection molded parts made from the polyamide-imide. These molded parts are useful where added stiffness and/or strength are critical. Automotive components such as push rods or rocker arms and aircraft components such as fittings or secondary structures are examples. Other objects appear hereinafter.

I have now found that amide-imide polymers and copolymers obtained by reacting a polycarboxylic acid anhydride with one or a mixture of primary diamines can be quickly and readily covered with continuous graphite fiber reinforcement impregnated with amide-imide into injection molded parts by insertion of the prepreg into the mold cavity before injection molding to provide engineering plastic parts with excellent properties. The polymers used in my invention are prepared by reacting an acyl halide derivative of an aromatic tricarboxylic-acid-anhydride with one or a mixture of largely- or wholly-aromatic primary diamines. The resulting products are polyamides wherein the linking groups are predominantly amide groups, although some may be imide groups, and wherein the structure contains free carboxylic acid groups which are capable of further reaction. Such polyamides are moderate molecular weight (7-13,000 as prepared) polymeric compounds having, in their molecule, units of:

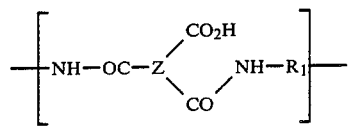

and units of:

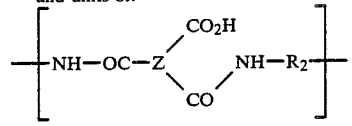

and, optionally, units of:

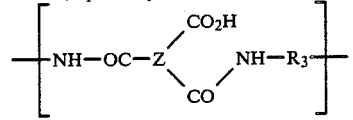

wherein the free carboxyl groups are ortho to one amide group, Z is an aromatic moiety containing 1 to 4 benzene rings or lower-alkyl-substituted benzene rings, $R_1$, $R_2$ and $R_3$ are the same for homopolymers and are different for copolymers and are divalent wholly- or largely-aromatic hydrocarbon radicals. These hydrocarbon radicals may be a divalent aromatic hydrocarbon radical of from 6 to about 10 carbon atoms, or two divalent aromatic hydrocarbon radicals each of from 6 to about 10 carbon atoms joined directly or by stable linkages, such as $-O-$, methylene, $-CO-$, $-SO_2-$, $-S-$; for example, $-R'-O-R'-$, $-R'-CH_2-R'-$, $-R'-CO-R'$, $-R'-SO_2-R'-$ and $-R'-S-R'-$.

Said polyamides are capable of substantially complete imidization by heating, by which they form the polyamide-imide structure having, to a substantial extent, recurring units of:

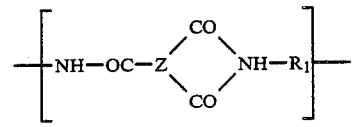

and units of:

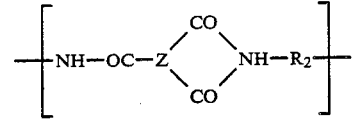

and, optionally, units of:

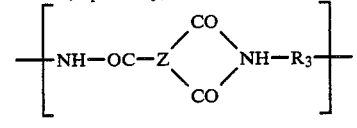

wherein one carbonyl group is meta to and one carbonyl group is para to each amide group and wherein Z, $R_1$, $R_2$ and $R_3$ are defined as above. Typical copolymers of this invention have up to about 50 percent imidization prior to heat treatment, typically about 10 to about 40 percent.

The polyamide-imide copolymers are prepared from an anhydride-containing substance and a mixture of wholly- or partially-aromatic primary diamines. Usually the anhydride-containing substance is an acyl halide derivative of the anhydride of an aromatic tricarboxylic acid which contains about 1 to about 4 benzene or lower-alkyl-substituted benzene rings and wherein two of the carboxyl groups are ortho to one another. More preferably, the anhydride-containing substance is an acyl halide derivative of an acid anhydride having a single benzene or lower-alkyl-substituted benzene ring, and most preferably, the substance is the acyl chloride derivative of trimellitic acid anhydride (4-TMAC).

We can use a single diamine but usually the mixture of diamines contains two or more, preferably two or three, wholly- or largely-aromatic primary diamines. More particularly, they are wholly- or largely-aromatic primary diamines containing from 6 to about 10 carbon atoms or wholly- or largely-aromatic primary diamines composed of two divalent aromatic moieties of from 6 to about 10 carbon atoms, each moiety containing one primary amine group, and the moieties are linked directly or through, for example, a bridging —O—, —S—, —SO$_2$—, —CO—, or methylene group. When three diamines are used, they are preferably selected from the class composed of:

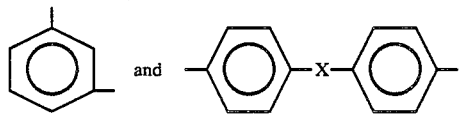

said X being an —O—, —CH$_2$—, or —SO$_2$— group. More preferably, the mixture of aromatic primary diamines is in the one-component or two-component system and is composed of meta-phenylenediamine and p,p'-oxybis(aniline) and meta-phenylenediamine, or p,p'-sulfonylbis(aniline) and p,p'-methylenebis(aniline). Most preferably, the mixture of primary aromatic diamines contains meta-phenylenediamine and p,p'-oxybis(aniline). In the one-component system, the preferred diamines are oxybis(aniline) or meta-phenylenediamine (MPDA). The aromatic nature of the diamines provides the excellent thermal properties of the homopolymer and/or copolymers while the primary amine groups permit the desired imide rings and amide linkages to be formed.

Usually, the polymerization or copolymerization is carried out in the presence of a nitrogen-containing organic polar solvent such as N-methylpyrrolidone (NMP), N,N-dimethylformamide and N,N-dimethylacetamide. The reaction should be carried out under substantially anhydrous conditions and at a temperature below about 150° C. Most advantageously, the reaction is carried out from about 20° to about 50° C.

The reaction time is not critical and depends primarily on the reaction temperature. It may vary from about 1 to about 24 hours, with about 2 to about 4 hours at about 30° to about 50° C. preferred for the nitrogen-containing solvents.

The polyamide-imide polymers are condensation products of trimellitic anhydride and various aromatic diamines, which when polymerized, form a poly(amide-imide) polymer and water. Like all condensation polymers, amide-imide (A-I) resins must be dried prior to processing; however, during plasticization, most polymerization can occur resulting in addition H$_2$O to be liberated from the polymer. This moisture can cause problems during molding and cure and must be removed from the part without affecting its shape. To protect the molded part integrity, prolonged cure times are required. When the cure times are shortened, internal foaming occurs resulting in an undesirable dimensional change in the final part as well as internal voids. Foaming can also occur during post curing, thus elaborate post cure cycles are required, especially in thick wall parts. Some of these post cure cycles are as long as 30–40 days with sequential temperature increments from about 300° F. to about 500° F.

Post curing is necessary for our polyamide-imide resins to enhance the glass transition temperature (Tg), and thus properties, by imidizing the molded part at 500° F. while increasing its molecular weight. The lower temperatures are necessary to liberate the internal moisture from the polyamide-imide parts without causing cracking or foaming while raising its Tg.

If a polyamide-imide part is thermally shocked at about 500° F., distortion and/or catastrophic fractures can occur due to the internal pressures generated from the super-heated steam on the uncured polyamide-imide matrix. This is dependent on the part thickness and the amount of H$_2$O generated during fabrication.

The injection molding of the polyamide-imides is carried out by injecting the polyamide-imides into a mold maintained at a temperature of about 350° F. to about 450° F., in which continuous graphite fiber impregnated with polyamide-imide polymer has been inserted into the mold cavity. In this process, a 15 to 30 second cycle is used with a barrel temperature of about 580° to about 640° F. The injection molding conditions are given in Table 1.

TABLE 1

| Mold Temperature | 350° to 450° F. |
|---|---|
| Injection Pressure | 17,000 to 23,000 psi and held for 3 to 7 seconds |
| Back Pressure | 500 psi |
| Cycle Time | 15 to 30 seconds |
| Extruder: | |
| Nozzle Temperature | 610° to 650° F. |
| Barrels: | |
| Front Heated to | 580° to 640° F. |
| Screw Speed | 20 to 50 revolutions/minute |

The following examples illustrate the preferred embodiment of the invention. It will be understood that the examples are for illustrative purposes only and do not purport to be wholly definitive with respect to conditions or scope of the invention.

EXAMPLE I

A 690-gram portion of dimethylacetamide (DMAC) was stirred and cooled to 5° C. with dry nitrogen purging to keep the system dry. An intimate mixture composed of 252.2 grams of 4-TMAC, 119.0 grams of p,p'-methylenebis(aniline) (MBA), and 120.0 grams of p,p'-oxybis(aniline) (OBA) was then added to the solvent over a period of 30 minutes. The temperature of the reaction was allowed to rise to 50° C. At that temperature, it was controlled by means of an ice bath. An additional 100 grams of DMAC were then added to wash in all solids, and the reaction continued for another 3½ hours at 50° C. The reaction solution was then poured into a large excess of rapidly-agitated water, whereupon precipitation of the copolymer took place. The solids were then washed several times with distilled water and soaked overnight. Finally, the solids were dried at 120° F. A 443-gram yield of the copolymer was obtained.

EXAMPLE II

A solution consisting of 533.3 grams of NMP, 300 grams of DMAC, and 58.0 grams of propylene oxide was stirred and cooled to 8° C. A mixture of 168.5 grams of 4-TMAC, 80.1 grams of OBA, and 79.3 grams of MBA was then added to the solvent over a period of 50 minutes. During this time, the reaction was allowed to warm to 36° C. An additional 66.7 grams of NMP was added to wash in all solids, then the reaction mixture was heated to 50° C. and held at that temperature for 3½ hours. The solution was then filtered.

EXAMPLE III

The general procedure for preparing a copolymer containing three diamines is illustrated by the reaction of OBA, MPDA and MBA and 4-TMAC in DMAC. Thus, a 242.0-gram portion of OBA (1.21 moles), a 130.7-gram portion of MPDA (1.21 moles) and a 239.6-gram portion of MBA (1.21 moles) were dissolved in 3,900 grams of DMAC contained in a 6-liter flask, equipped with a nitrogen purge, stirrer, addition funnel and thermometer. A 765-gram portion of 4-TMAC (3.63 moles) in flake or lump form was then added to the solution in portions over 90 minutes. The reaction exotherm was allowed to raise the temperature to about 35° C. The reaction temperature was maintained at 33°–38° C. for the remainder of the 4-TMAC addition using cooling water when necessary. After the TMAC addition was completed, any residual TMAC clinging to the addition funnel was completely washed into the reaction solution with 70 grams of DMAC. A heating mantle was applied to the reaction flask and the temperature quickly raised (about 20 min.) to 50° C. The reaction solution was stirred at 50° C. for 90 minutes and then the solution was precipitated by admixing the water. Prior to precipitation, the solution viscosity was about 7.5 stokes (25° C., 20 percent solids). The polymer was precipitated in distilled water in a model D, W. J. Fitzpatrick Company, comminuting machine (Fitz mill). After precipitation, the polymer was washed with distilled water to aqueous pH 4 to 5 (3 to 4 hours washing time), then filtered onto large Buchner funnels. The polymer was dried overnight by drawing air through the funnels, then finally dried in an aeromat drier at 30°–35° C. for 12–15 hours.

EXAMPLE IV

A 78-gram amount of the copolymer in powdered form, made according to the procedures set forth in Example I, was heated to 550° F. for about 1 hour. It was then cooled and charged cold into a mold preheated in the press to about 600° to about 650° F. A maximum pressure of 4,200 psi was applied over a 25-minute period and thereafter the mold and contents cooled to 500° F. under a pressure of 2,100 psi and the molded item immediately was ejected. A disk measuring 5½ inches in diameter and ⅛ inch thick had been formed.

EXAMPLE V

A 200-ml, round-bottom, 4-neck flask, equipped with a nitrogen inlet tube, stirrer, thermometer, and solids addition funnel, was charged with 99.9 parts by weight (pbw) of OBA, 23.1 pbw MPDA and 604 pbw NMP. When solution at room temperature (72° F.) was complete, 150 pbw 4-TMAC, having a percent purity of 99.5±0.5 percent as determined from chloride content, was added over 2.5 hours while maintaining a solution temperature of between about 77°–95° F. When addition was complete, the solution was stirred for 3 hours during which time the solution viscosity increased to a Gardner-Holdt value of Z5+ or about 110 poises.

Solid polymer was obtained by first pouring the viscous solution into twice its volume of distilled water in a Waring blender and then filtering. The filtrate was washed with 5 increments of 3000 pbw each of distilled water to remove hydrogen chloride that had been generated during reaction.

The solid was dried under a vacuum of 20 inches of mercury for 24 hours at 122° F. Three percent by weight of $TiO_2$ was added to the dried polymer.

EXAMPLE VI

The polymer as prepared in Example V was dried under vacuum of 20 inches of mercury for 24 hours at 122° F. In addition, three percent by weight of $TiO_2$ and 0.5 percent by weight of polytetrafluoroethylene (PTFE) were added to the dried polymer.

Composite Skin Inserts for Injection Molded Parts

Graphite woven fabrics were impregnated or solvent coated with a 36% solution of amide-imide polymer powders prepared as shown in Example V and VI in NMP solvent to an approximate resin solids content of 40 weight percent. The impregnated fabrics (prepregs) were oven dried for 1 hour at 300° F. to approximately 12% residual solvent.

Experiments were conducted in which pieces of the above prepreg were used as inserts on the surface of an injection cavity. Initial trials utilized a 5 inch diameter and 14 inch thick puck cavity mold. Mold temperature was approximately 450° F. Injection pressure was 38,000 psi. Inserts were placed only on one side prior to mold closure. The inserts were preconditioned as described below. Precondition (staging) parameters are important in achieving a good bond between the reinforcement and the injected polymer. Cycle time was 1½ minutes.

Insert was easily held in position via interference fit. A double cavity or clips to hold the inserts in place are required if inserts are used on more than one side of the mold. The mold cavity is gated so as to minimize shear forces at the mold surface. Gate design is critical to the success of this technique.

The concept of composite (continuous fiber) inserts for injection-molded parts has broad application. Fabrics woven from glass, graphite and other high strength, thermally stable fibers would be applicable. Woven fabrics are available ranging from equal bidirectional strength to nearly unidirectional properties. Non-woven tape is also impregnated with polyamide-imide polymers (prepregged). Non-woven conductive fabrics are applicable to RF/EMI (radio frequency/electromagnetic interference) shielding parts. Also, hybrid fabrics are available with various fiber combinations.

Our process is particularly applicable to polyamide-imides because of the high performance nature of polyamide-imides. It is equally suited to other engineering thermoplastics or thermoplastics which could meet performance requirements with reinforcement. Glass and graphite impregnated fabric material costs are high but tolerable in many metals substitution applications where injection molded parts cannot meet performance requirements, and the only other "plastic" alternative is compression molded laminates. Also, it is anticipated that the composite insert represents a low percentage of the total material volume and the injection material is a nonreinforced material.

My process is particularly applicable to the manufacture of polyamide-imide parts with complex geometry. This type of part is very difficult to compression mold from continuous fiber composites or any fibrous compound with low flow characteristics. The impregnated fabric is formed during the 500° F. staging step with inexpensive tooling such that the insert will fit on the cavity surface-even for parts with complex geometry. Numerous inserts could be shaped with a multi-cavity tool (cast aluminum, FRP (fiber reinforced plastic), cast epoxy, ceramic, etc.) which is clamped or weighted to low forming pressures during staging. The formed inserts are then die cut to fit the injection cavity. Scrap material is diced and used as a low flow bulk molding compound.

The inserts as described above need not necessarily be skins located on part surfaces, but are suitably in the form of preconsolidated reinforcing rods, rings, or any other configuration which can be maintained in the desired location of the cavity during injection.

The final cure of the impregnation polymer is achieved by post curing of injection molded parts with continuous fiber skins or inserts.

TABLE 2

| Sample | Prepreg Dry | Staging | Temp. Into Mold |
|---|---|---|---|
| 80-3-7-1 | 1 hr @ 300° F. | Press 5 min @ 425° F. @ 35 psi | Room Temperature |
| 80-3-7-2 | 1 hr @ 300° F. | Press 5 min @ 425° F. @ 35 psi Plus 10 min @ 500° F. | 500° F. |
| 80-3-11-1 | 1 hr @ 300° F. | 1 hr @ 500° F. | Room Temperature |

| Sample | Molding Resin | Bond Out of Mold | Bond Post Cure |
|---|---|---|---|
| 80-3-7-1 | Example VI | Good | Good |
| 80-3-7-2 | Example VI | Good | Delaminated |
| 80-3-11-1 | Example VI | Good | Delaminated |

I claim:

1. A molded object comprising the following structure:

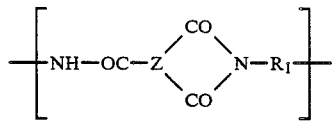

and units of:

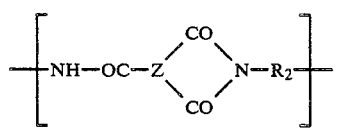

wherein one carbonyl group is meta to and one carbonyl group is para to each amide group and wherein z is a trivalent benzene ring or lower-alkyl-substituted trivalent benzene ring, $R_1$ and $R_2$ are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —$SO_2$—, and —S— radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit coated with continuous graphite fiber or woven graphite fabric or graphite unidirectional tape impregnated with a polyamide-imide of the following structure:

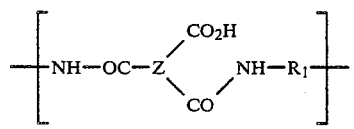

and units of:

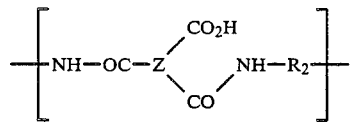

wherein the free carboxyl groups are ortho to one amide group, Z is a trivalent benzene ring or lower-alkyl-substituted trivalent benzene ring, $R_1$ and $R_2$ are the same or are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —$SO_2$—, and —S— radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit.

2. The molded object of claim 1 wherein, in both the molded object and the polyamide-imide impregnated continuous graphite fiber, or woven graphite fabric or graphite unidirectional tape, $R_1$ is:

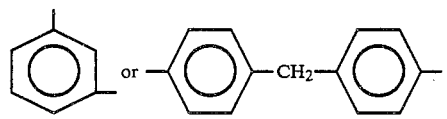

and $R_2$ is:

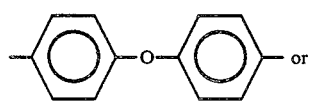

-continued

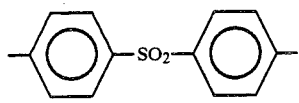

or wherein $R_1$ is:

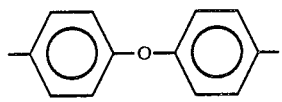

and $R_2$ is:

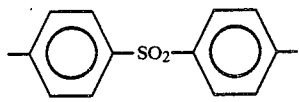

3. The molded object of claim 1, wherein in both the molded object and the graphite woven polyamide-imide coated fabric, Z is a trivalent benzene ring, $R_1$ is:

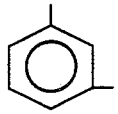

and $R_2$ is:

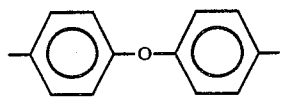

and wherein the concentration range runs from about 30 mole percent of the $R_1$ containing units and about 70 mole percent of the $R_2$ containing units to about 70 mole percent of the $R_1$ containing units and about 30 mole percent of the $R_2$ containing units.

4. A molded object comprising the following structure:

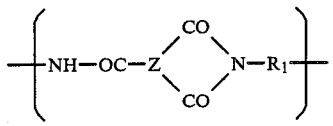

and units of:

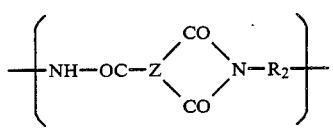

wherein one carbonyl group is meta to and one carbonyl group is para to each amide group and wherein Z is a trivalent benzene ring or lower-alkyl-substituted trivalent benzene ring, $R_1$ and $R_2$ are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —$SO_2$—, and —S— radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit coated with a graphite fabric impregnated with a polyamide-imide of the following structure:

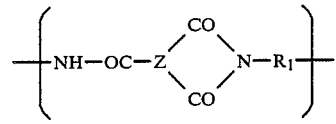

and units of:

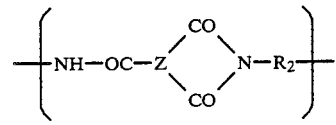

wherein one carbonyl group is meta to and one carbonyl group is para to each amide group and wherein Z is a trivalent benzene ring or lower-alkyl-substituted trivalent benzene ring, $R_1$ and $R_2$ are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —$SO_2$—, and —S— radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit.

5. The molded object of claim 4 wherein, in both the molded object and the graphite woven polyamide-imide coated fabric, $R_1$ is:

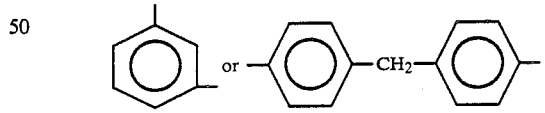

and $R_2$ is:

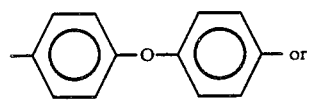

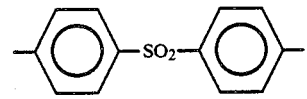

or wherein $R_1$ is:

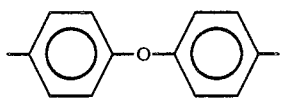

and R₂ is:

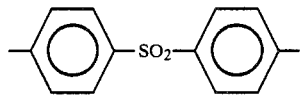

6. The molded object of claim 4 wherein, in both the molded object and the graphite woven polyamide-imide coated fabric, Z is a trivalent benzene ring, R₁ is:

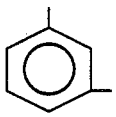

and R₂ is:

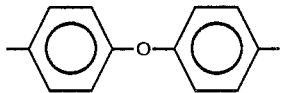

and wherein the concentration range runs from about 30 mole percent of the R₁ containing units and about 70 mole percent of the R₂ containing units to about 70 mole percent of the R₁ containing units and about 30 mole percent of the R₂ containing units.

7. A process for injection molding continuous woven graphite fibers or graphite woven fabrics or graphite unidirectional tape impregnated with a polyamide-imide of claim 1 on the surface of polyamide-imides of the following structures:

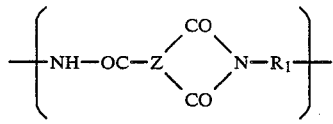

and units of:

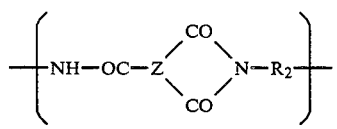

wherein one carbonyl group is meta to and one carbonyl group is para to each amide group and wherein Z is a trivalent benzene ring or lower-alkyl-substituted trivalent benzene ring, R₁ and R₂ are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —SO₂—, and —S— radicals and wherein said R₁ and R₂ containing units run from about 10 mole percent R₁ containing unit and about 90 mole percent R₂ containing unit to about 90 mole percent R₁ containing unit and about 10 mole percent R₂ containing unit, which process comprises injecting into the mold cavity the impregnated fabric and then injection molding the polyamide-imide copolymer at a temperature of about 630° to about 680° F. at a back pressure of about 50 to about 5000 psi.

8. The process of claim 7 wherein, in both the molded object and the graphite woven polyamide-imide coated fabric, R₁ is:

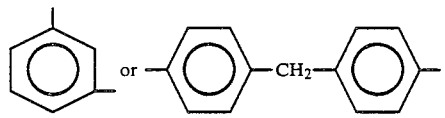

and R₂ is:

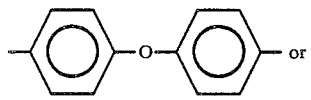

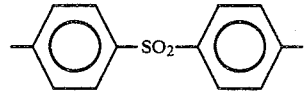

or wherein R₁ is:

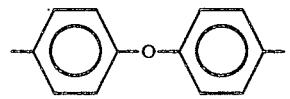

and R₂ is:

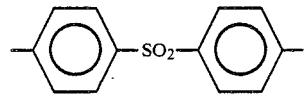

9. The process of claim 7 wherein, in both the molded object and the graphite woven polyamide-imide coated fabric, Z is a trivalent benzene ring, R₁ is:

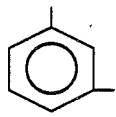

and R₂ is:

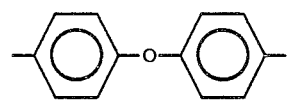

and wherein the concentration range runs from about 30 mole percent of the R₁ containing units and about 70 mole percent of the R₂ containing units to about 70 mole percent of the R₁ containing units and about 30 mole percent of the R₂ containing units.

* * * * *

UNITED STATES PATENT OFFICE
CERTIFICATE OF CORRECTION

Patent No. 4,600,617            Dated    July 15, 1986

Inventor(s)   Bill W. Cole

It is certified that error appears in the above-identified patent and that said Letters Patent are hereby corrected as shown below:

| Patent Column | Line | |
|---|---|---|
| 4 | 2 | reads "in addition" and should read -- in additional -- |
| 5 | 41 | reads "the" and should read -- with -- |
| 5 | 55 | reads "procedures" and should read -- procedure -- |
| 5 | 56 | reads "to" and should read -- at -- |
| 7 | 16 | reads "surface-even" and should read -- surface -- even -- (dash, not hyphen) |

Signed and Sealed this

Twenty-first Day of April, 1987

*Attest:*

DONALD J. QUIGG

*Attesting Officer*     *Commissioner of Patents and Trademarks*